United States Patent
Seely et al.

(10) Patent No.: US 11,528,227 B1
(45) Date of Patent: Dec. 13, 2022

(54) INTEGRATED TRAFFIC PROFILE FOR INDICATING MULTI-LEVEL CONGESTION AND PACKET DROP FOR CONGESTION AVOIDANCE

(71) Applicant: Hewlett Packard Enterprise Development LP, Houston, TX (US)

(72) Inventors: Jonathan Michael Seely, Cool, CA (US); Giuseppe Scaglione, Granite Bay, CA (US); Sergio Jesus Guillen Hernandez, San Jose, CA (US); Paymon Ghamami, Folsom, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/477,437

(22) Filed: Sep. 16, 2021

(51) Int. Cl.
 *H04L 47/12* (2022.01)
 *H04L 47/30* (2022.01)
 *H04L 47/32* (2022.01)
(52) U.S. Cl.
 CPC .............. *H04L 47/12* (2013.01); *H04L 47/30* (2013.01); *H04L 47/32* (2013.01)

(58) Field of Classification Search
 CPC .......... H04L 47/12; H04L 47/30; H04L 47/32
 See application file for complete search history.

(56) References Cited

U.S. PATENT DOCUMENTS

2019/0379604 A1* 12/2019 Li ........................... H04L 47/18

\* cited by examiner

*Primary Examiner* — Siming Liu
(74) *Attorney, Agent, or Firm* — Park, Vaughan, Fleming & Dowler LLP

(57) ABSTRACT

A system for facilitating an enhanced traffic profile is provided. During operation, the system can determine a first traffic profile indicating whether to drop a packet based on the utilization of a queue. The packets from the queue can be forwarded via an egress port reachable via a fabric. The system can also determine a second traffic profile indicating whether to indicate congestion in the packet based on the utilization. The system can then determine a third traffic profile by combining the first and second traffic profiles. The third traffic profile can indicate acceptance at the queue for a subset of packets with a low-level congestion indicator or selected for dropping based on the utilization. Subsequently, the system can, if the packet is selected for dropping, determine whether to accept the packet at the queue with a high-level congestion indicator in the packet based on the third traffic profile.

20 Claims, 9 Drawing Sheets

US 11,528,227 B1

INTEGRATED TRAFFIC PROFILE FOR INDICATING MULTI-LEVEL CONGESTION AND PACKET DROP FOR CONGESTION AVOIDANCE

BACKGROUND

Field

The present disclosure relates to communication networks. More specifically, the present disclosure relates to a method and system for using an integrated traffic profile for determining a multi-level congestion indicator and packet drop for congestion avoidance.

BRIEF DESCRIPTION OF THE FIGURES

In the figures, like reference numerals refer to the same figure elements.

DETAILED DESCRIPTION

Figure 1:
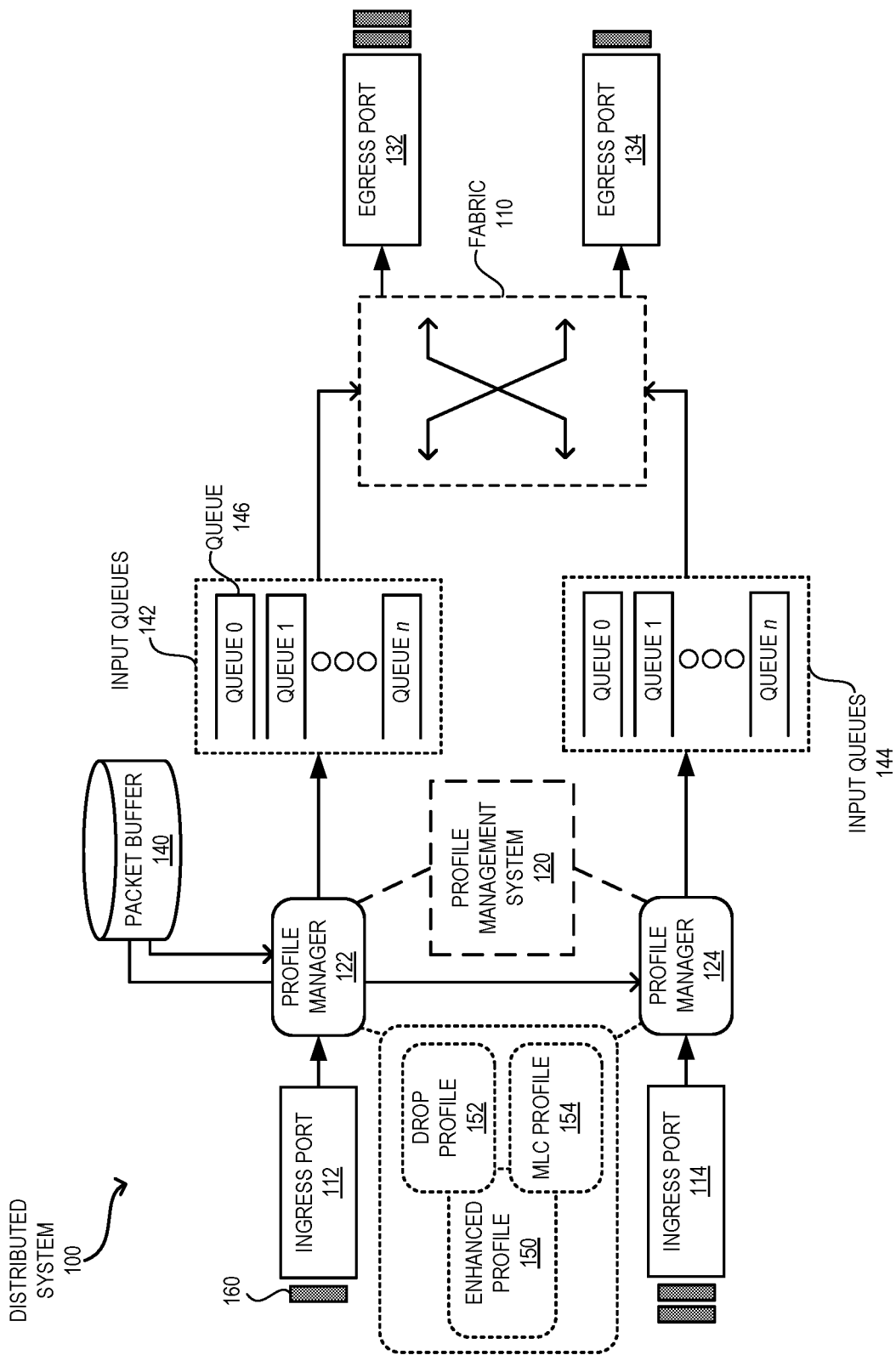
FIG. 1 illustrates an example of a distributed system supporting an integrated traffic profile for indicating multi-level congestion and packet drop, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

Internet is the delivery medium for a variety of applications running on physical and virtual devices. Such applications have brought with them an increasing demand for bandwidth. As a result, equipment vendors race to build larger devices with significant processing capabilities. Consequently, a distributed system may include different types of devices, such as a sender node that may send a large number of packets and a receiver node that may receive the packets. Typically, the receiver node can receive packets from an input queue of the sender node and forward the packets via an egress port. However, if the input queue becomes overutilized, packets sent from the input queue may cause congestion at the egress port. In other words, a device coupled to the egress port may become overwhelmed with the packets sent from the input queue.

To avoid such a scenario, the sender node may deploy one or more congestion avoidance techniques. Examples of such techniques include weighted random early detection (WRED) and Multi-level Explicit Congestion Notification (MECN). A packet drop's effect on the traffic flow can be more adverse when more packets are sent from the sender node due to the design of the higher-layer protocols, such as Transmission Control Protocol (TCP). To avoid such a scenario, the WRED profile on the sender node may drop a packet upon detecting congestion at the input queue. On the other hand, if congested detected at the input queue, the MECN profile may set an indicator in a packet in the input queue. The indicator can indicate that the sender node has detected a level of congestion. For example, MECN can use an ECN-specific field in the IP header with two bits. These two bits can be mapped to the least significant bits of the Differentiated Services Code Point (DSCP) field in an Internet Protocol (IP) header of the packet.

One aspect of the present technology can provide a system for facilitating an integrated traffic profile for indicating a level of congestion and packet drop. The system can include a traffic profile logic block that can determine a first traffic profile indicating whether to drop a packet based on the utilization of a queue. The packets from the queue can be forwarded via an egress port reachable via a fabric of interconnections. The traffic profile logic block can also determine a second traffic profile indicating whether to indicate congestion in the packet based on the utilization of the queue. Subsequently, the traffic profile logic block can determine a third traffic profile by combining the first and second traffic profiles. The third traffic profile can indicate acceptance at the queue for a subset of packets being selected for dropping prior to being inserted into the queue based on the utilization of the queue. The system can also include an assertion logic block that can, if the packet is selected for dropping, determine whether to accept the packet into the queue with a high-level congestion indicator based on the third traffic profile. The system can also include a marking logic block that can, if the utilization of the queue is less than a congestion threshold, accept the packet into the queue with a low-level congestion indicator in the packet based on the third traffic profile.

In a variation on this aspect, the system can include an indicator logic block that can determine whether the computer system is capable of indicating congestion in the packet.

In a variation on this aspect, the assertion logic block can also obtain a first probability value generated by a piece of hardware of the computer system and compare the first probability value with a second probability value. The second probability value can be indicated in the third profile and corresponds to the utilization of the queue.

In a further variation, the second probability value is defined as a linear slope between the probability of indicating the level of congestion the packet and the utilization of the queue.

In a further variation, to determine whether to accept the packet at the queue, the assertion logic block can determine whether the utilization of the queue is greater than a drop threshold indicated in the third profile. The assertion logic block can then determine whether the first probability value is greater than the second probability value.

In a further variation, the assertion logic block can, if the first probability value is less than the second probability value and the utilization of the queue is greater than the drop threshold, drop the packet.

In a further variation, the marking logic block can, if the packet is not being selected for dropping, the utilization of the queue is greater than the congestion threshold, and the first probability value is greater than the second probability value, accept the packet into the queue with a high-level congestion indicator in the packet.

In a further variation, to accept the packet into the queue with the low-level congestion indicator, the marking logic block can determine whether the utilization of the queue is less than the congestion threshold and whether the first probability value is greater than the second probability value.

In a variation on this aspect, the first profile is a profile of random early detection (RED) or a variation thereof, and the second profile is a profile of Multi-level Explicit Congestion Notification (MECN) or a variation thereof.

The examples described herein solve the problem of mitigating the conflicting effects of drop and multi-level congestion (MLC) traffic profiles by (i) combining drop and MLC traffic profiles into a combined enhanced traffic profile; and (ii) determining whether to drop a packet or accept the packet with a congestion-level indicator in an input queue based on the enhanced traffic profile. In this way, a switch may accept the packet and mark the packet with the congestion-level indicator in the input queue even if the packet is selected for dropping by the drop traffic profile. As a result, the switch can converge the conflicting traffic profiles and avoid packet drops when possible.

With existing technology, packets received at an ingress port of a switch can be forwarded to one or more corresponding egress ports via a switching fabric. The switching fabric can be within the switch or may span a plurality of switches. If the number of packets, which may indicate traffic volume, for an egress port received at the switch exceeds the egress port's capability, the switch may store the packets in an input queue (e.g., a finite buffer). The packets may remain queued until the egress port can forward packets. When the input queue becomes utilized up to a threshold level, the switch may include an indicator in the subsequent packets. The indicator can indicate a level of congestion that the input queue has experienced. Furthermore, due to the finite size of the input queue and the prolonged arrival of high-volume traffic for the egress port, the switch may not be able to store some packets. Consequently, the switch may discard (or drop) packets for the egress port.

However, congestion and pack drops in a network can be undesirable. For example, increased congestion level at the switch can further degrade the efficiency of the switch and the surrounding network. Moreover, a packet's use of the network resources can become misspent if the packet is dropped. In addition, respective subsequent retransmission of the packet may require further resources of the network. If the retransmitted packet is dropped, the further network resources can also become misspent. To avoid such a scenario, a switch can use one or more traffic profiles on an incoming packet. For example, to determine whether to accept that packet in an input queue or drop the packet, the switch can apply a drop traffic profile (or drop profile) on the packet. On the other hand, the switch can apply a multi-level congestion (MLC) traffic profile (or MLC profile) to determine whether to indicate a level of congestion in the packet prior to accepting the packet into the input queue.

Examples of a drop profile can include, but are not limited to, a random early detection (RED), weighted RED (WRED), adaptive RED or active RED (ARED), and Robust random early detection (RRED). Furthermore, examples of a MLC profile can include, but are not limited to, a multi-level variation of Explicit Congestion Notification (ECN), Backward ECN (BECN), and Backward Congestion Notification (BCN). However, drop and MLC profiles (e.g., WRED and multi-level ECN (MECN), respectively) are often deployed together in the switch for avoiding and reducing the number of dropped packets in a network. Both traffic profiles may operate with a feedback mechanism for conveying network congestion information, such as the level of congestion at an input queue, between a sender and a corresponding receiver. Based on the feedback, the sender can reduce the transmission rate and hence, may reduce the probability of packet drops.

The traffic profiles can indicate at what point packets may start to be marked or discarded as the depth or utilization of the input queue increases. Consequently, the probability of a packet being marked or discarded can also increase (e.g., based on respective configurable linear slopes associated with the profiles). For example, using a drop profile, the switch may slowly increase the number of discarded packets as the congestion increases. A transport protocol deployment, such as Transmission Control Protocol (TCP), at the switch may remain aware of the discarded packets and eventually cause the switch to reduce the transmission rate to a receiver switch.

Similarly, the switch's MLC profile can allow the switch to mark or tag a packet indicating that the packet has experienced a level of congestion (e.g., low or high). As the utilization of the input queue increases, the probability of an incoming packet experiencing congestion may also increase. Accordingly, the MLC profile can maintain a congestion point. When the utilization remains between the starting point of the slope and the congestion point, the switch can mark an incoming packet with a low-level congestion indicator based on the slope. When the utilization reaches the congestion point, the switch can mark an incoming packet with a high-level congestion indicator based on the slope.

When the drop and MLC profiles are used in the same switch, if the network becomes overly congested, the switch may discard most packets due to the drop profile. In other words, the MLC profile may not be able to indicate the congestion level at the corresponding input queue in a packet since that packet would be selected for dropping by the drop profile. As a result, the discards caused by the drop profile may hinder an end host's ability to be notified regarding the congestion in the network. Consequently, the end host may continue to contribute to the congestion.

To solve this problem, the switch can be equipped with a profile management system that can facilitate an enhanced traffic profile (or enhanced profile), which can be a combination of the drop and MLC profiles. The enhanced traffic profile can be an integrated traffic profile for indicating both a level of congestion and packet drop for facilitating congestion avoidance. Since both drop and MLC profiles can have a starting point and a slope to determine when to mark or drop packets, the system can determine a combined slope for the enhanced profile. The enhanced profile can also include the congestion point of the MLC profile that can be used to indicate the level of congestion. In addition, the enhanced profile can also maintain a drop point of the drop profile that can indicate when to assert drop for a packet (e.g., based on an assertion mechanism). However, instead of dropping the packets with such an assertion, the enhanced profile allows the switch to accept a subset of the packets based on the slope and mark the subset of packets with a high-level congestion indicator.

Hence, the enhanced profile can include a region past the drop point that can allow acceptance for some packets with corresponding marking (i.e., indicating high-level congestion experienced). As a result, the enhanced profile can provide five areas of operations: accept packets without marking, accept packets with a low-level congestion marking, accept packets with a high-level congestion marking, accept a subset of packets with a high-level congestion marking, and drop packets. In this way, the enhanced profile facilitates a gradual transition to discarding packets once the drop profile reaches the drop point. By allowing the subset of packets to be communicated to the end host, the enhanced profile allows the end host to appropriately react and throttle transmission to reduce congestion.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of a distributed system supporting an integrated traffic profile for determining congestion indicator and packet drop, in accordance with an aspect of the present application. A distributed system 100 may comprise an interconnected switch fabric 110 that facilitates packet switches from ingress ports 112 and 114 to egress ports 132 and 134. Ports 112, 114, 132, and 134 may belong to the same switch where fabric 110 is within that switch. Ports 112, 114, 132, and 134 may also belong to different switches where fabric 110 can span across the different switches. A respective port can be coupled to a network. The network can be an Ethernet, Gen-Z, InfiniBand, or other networks, and may use a corresponding communication protocol, such as Internet Protocol (IP), memory-semantic communications, FibreChannel over Ethernet (FCoE), or other protocol. Consequently, a respective port can receive data units corresponding to the protocol of the network.

With existing technology, packets received at ingress port 132 or 134 can be forwarded to egress ports 132 and 134 via fabric 110 based on the corresponding destination addresses. In addition to ingress ports 132 and 134, packets can also be retrieved from packet buffer 140, which can store packets that are not switched to an egress port (e.g., promoted to the routing layer). If the number of packets received at ingress port 112 that are for egress port 132 exceeds egress port 132's capability, the packets can be stored in one of input queues 142. Similarly, if the number of packets received at ingress port 114 that are for egress port 132 exceeds egress port 132's capability, the packets can be stored in one of input queues 144. Each of the input queues can correspond to a priority class, such as the class of service indicated by the Institute of Electrical and Electronics Engineers (IEEE) P802.1p.

Suppose that packets for egress port 132 are stored in queue 146 of input queues 142. If egress port 132 cannot forward packets, which may belong to a priority class "0" associated with queue 146, from ingress port 112 at least at the ingress or arrival rate, the packets can be stored in queue 146. These packets may remain in queue 146 until egress port 132 can forward packets. When queue 146 becomes utilized up to a threshold level, a congestion indicator can be included in the subsequent packets. The indicator can indicate that queue 146 has experienced congestion. Furthermore, due to the finite size of queue 146 and the prolonged arrival of high-volume traffic for egress port 132, some packets may not be accommodated in queue 146. Consequently, such packets may be discarded (or dropped).

However, congestion and pack drops in distribution system 100 can be undesirable. For example, increased congestion level at queue 146 can further degrade the efficiency of packet forwarding via fabric 110. If a packet 160 received at ingress port 112 is dropped, packet 160's use of resources, such as bandwidth and processing capabilities, in system 100 can become misspent. In addition, respective subsequent retransmission of packet 160 may require further resources of system 100. If a retransmitted instance of packet 160 is dropped, the further resources can also become misspent. To avoid such a scenario, one or more traffic profiles can be applied to packet 160. For example, to determine whether to accept packet 160 in queue 146 or drop packet 160, a drop profile 152 can be applied on packet 160. On the other hand, an MLC profile 154 can be applied to packet 160 to determine whether to indicate a level of congestion in packet 160 prior to accepting packet 160 into queue 146.

When the drop profile 152 and MLC profile 154 are applied together, if queue 146 becomes congested, most packets that belong to the class "0" and are directed to egress port 132 may be discarded due to drop profile 152. In other words, MLC profile 154 may not be able to indicate the congestion for such packets since these packets would be selected for dropping by drop profile 152. As a result, the discards caused by drop profile 152 may hinder an end host's ability to be notified regarding the congestion in system 100. Consequently, the end host may continue to contribute to the congestion.

To solve this problem, a profile management system 120 can facilitate an enhanced profile 150, which can be a combination of drop profile 152 and MLC profile 154. Enhanced traffic profile 150 can be an integrated traffic profile for indicating both a level of congestion and drop for packet 160 for facilitating congestion avoidance across system 100. System 120 can provide a profile manager to a respective ingress port for applying enhanced profile 150 to the packets received at the ingress port. In this example, system 120 can provide profile managers 122 and 124 to ingress ports 112 and 114, respectively. Consequently, when packet 160 is received at ingress port 112, profile manager 122 can apply enhanced profile 150 to packet 160. Since both drop profile 152 and MLC profile 154 can have a starting point and a slope that can determine whether to mark or drop packet 160, profile manager 122 can apply a combined slope indicated in enhanced profile 150.

Enhanced profile 150 can also include the congestion point of MLC profile 154 that can be used to indicate the level of congestion. In addition, enhanced profile 150 can also maintain a drop point of drop profile 152 that can indicate when to assert drop for packet 160. However, instead of dropping 160 with such an assertion, enhanced profile 150 allows profile manager 122 to accept packet 160 into queue 146 based on the slope and mark packet 160 with an indicator indicating a high level of congestion. The congestion indicator in packet 160 can be communicated to the end host even though packet 160 has been selected for dropping. Consequently, enhanced profile 150 allows the end host to appropriately react and throttle transmission to reduce congestion. In this way, enhanced profile 150 facilitates a gradual transition to discarding packets once drop profile 152 reaches the drop point.

Figure 2A:
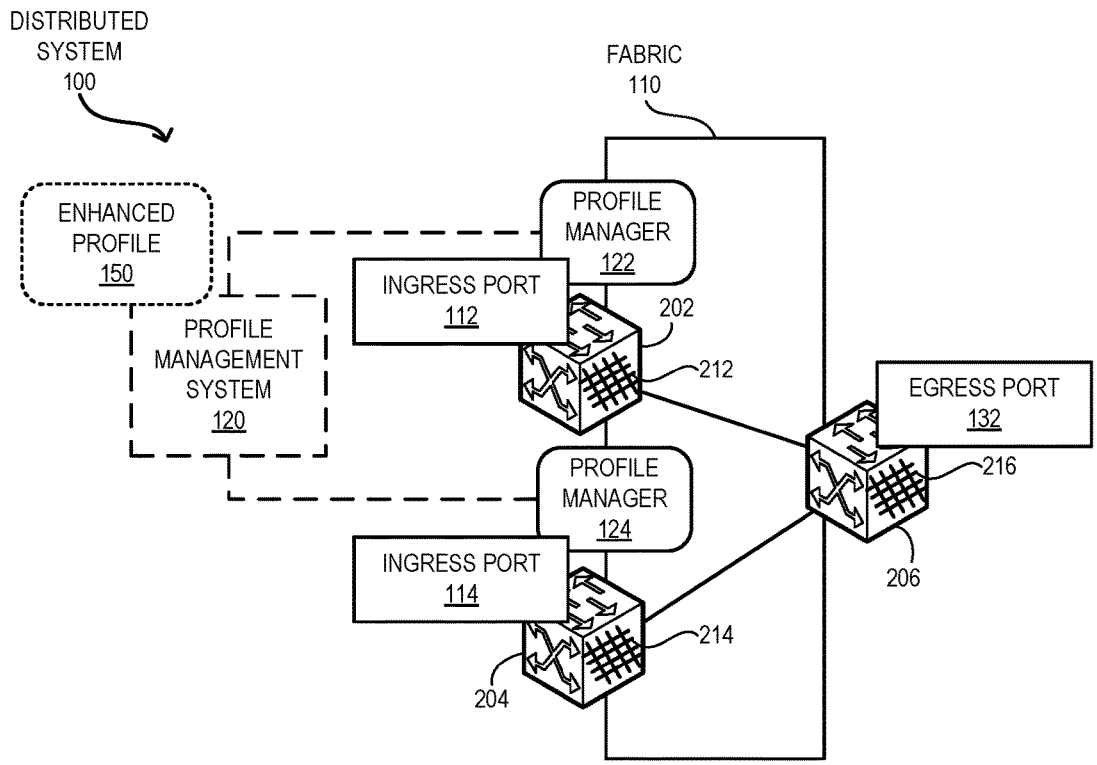
FIG. 2A illustrates an example of a fabric of interconnections spanning multiple switches supporting an integrated traffic profile, in accordance with an aspect of the present application.

FIG. 2A illustrates an example of a fabric of interconnections spanning multiple switches supporting an integrated traffic profile, in accordance with an aspect of the present application. Fabric 110 can span the switch fabrics of a plurality of switches 202, 204, and 206. The switching fabric in these switches can be coupled to each other via ports and links to form fabric 110. Switches 202, 204, and 206 can include switch fabrics 212, 214, and 216, respectively. Examples of a switch fabric include, but are not limited to, a crossbar switch, a Clos network, a banyan switch, and an Omega network. Profile managers 122 and 124 can independently apply enhanced profile 150 on packets received at ingress ports 112 and 124, respectively.

Figure 2B:
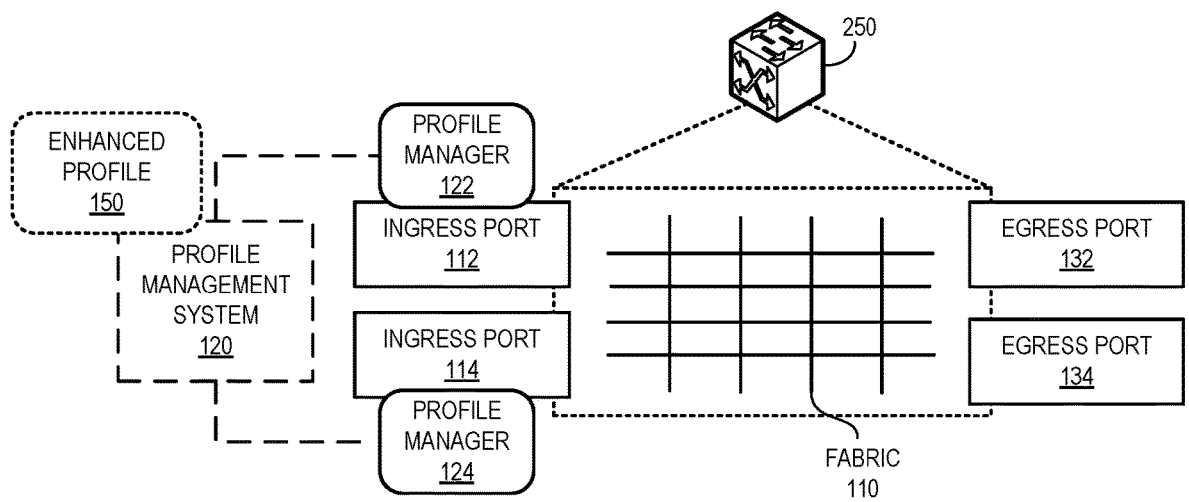
FIG. 2B illustrates an example of a fabric of interconnections within a switch supporting an integrated traffic profile, in accordance with an aspect of the present application.

FIG. 2B illustrates an example of a fabric of interconnections within a switch supporting an integrated traffic profile, in accordance with an aspect of the present application. Fabric 110 can be the local switch fabric of switch 250. The switching fabric in switch 250 can couple ingress ports 112 and 114 to egress ports 132 and 134. In this way, fabric 110 can span one or more switches. Consequently, enhanced profile 150 can be applied to a packet directed to a port coupled via fabric 110 regardless of the number of switches participating in fabric 110.

Figure 3:
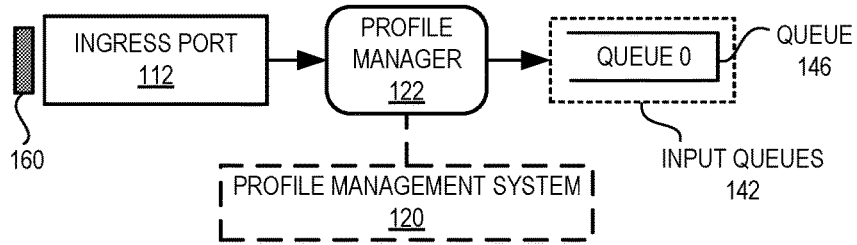
FIG. 3 illustrates an example of an integrated traffic profile for indicating multi-level congestion and packet drop, in accordance with an aspect of the present application.
Figure 3:
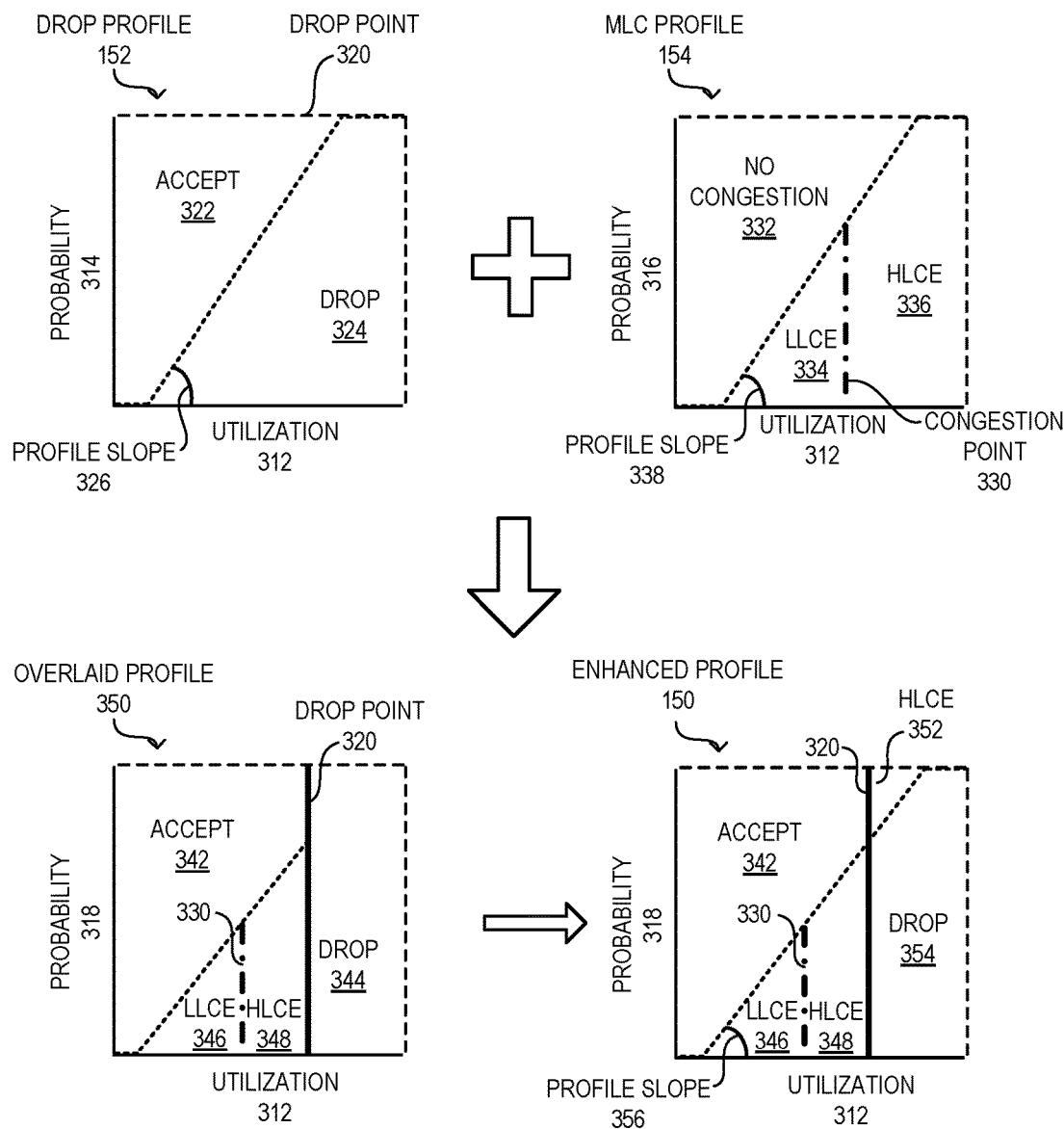

FIG. 3 illustrates an example of an integrated traffic profile for determining congestion indicator and packet drop, in accordance with an aspect of the present application. Profile manager 122 can apply drop file 152 and MLC profile 154 on a packet received at ingress port 112. Examples of drop profile 152 can include, but are not limited to, a RED, WRED, ARED, and RRED. Furthermore, examples of MLC profile 154 can include, but are not limited to, a multi-level variation of ECN, BECN, and BCN. Drop profile 152 and MLC profile 154 (e.g., WRED and MECN, respectively) can be deployed together for ingress port 112. Both profiles 152 and 154 may operate with a feedback mechanism for conveying network congestion information between a sender and a corresponding receiver. Based on the feedback, the sender can reduce the transmission rate and hence, may reduce the probability of packet drops.

Using drop profile 152, profile manager 122 may slowly increase the number of discarded packets as the congestion increases at queue 146. The deployment of a transport protocol, such as TCP, may remain aware of the discarded packets and eventually reduce the transmission rate from queue 146. As the depth or utilization of queue 146 increases, drop profile 152 indicates at what point traffic should be discarded. Drop profile 152 can include a configurable drop point 320, which indicates utilization 312 at which queue 146 should be congested. Drop profile 152 can also include a configurable slope 326 (e.g., a linear slope). The slope line of slope 326 can indicate that the increase in utilization 312 can increase probability 314 of a drop (e.g., from 0% to 100%). The region above the slope line can be referred to as accept region 322, which can indicate acceptance of packet 160. On the other hand, the region below the slope line can be referred to as drop region 324, which can indicate that packet 160 would be dropped.

Consequently, as utilization 312 of queue 146 increases, probability 314 that packet 160 may be discarded can also increase (e.g., from 0% to 100%). When packet 160 is received at ingress port 112, profile manager 122 can use an assertion mechanism to determine the corresponding region for packet 160. For example, profile manager 122 can obtain a hardware-generated pseudo-random number (e.g., between 0 and 100) as a probability value for packet 160 and compare the number with the probability value indicated by the slope line at the current value of utilization 312. Profile manager 122 may trigger a linear-feedback shift register (LFSR) to obtain the probability value for packet 160. If the probability value falls in region 322, profile manager 122 can select packet 160 for accepting into queue 146. On the other hand, if the probability value falls in region 322, profile manager 122 can select packet 160 for discarding.

Similarly, MLC profile 154 can allow profile manager 122 to mark or tag packet 160, indicating that packet 160 has experienced a level of congestion (e.g., low or high). As the utilization of queue 146 increases, probability 316 of packet 160 experiencing congestion may also increase. Therefore, traffic profile 154 can indicate at what point packets may start to be marked with a low-level congestion or a high-level congestion utilization 312 increases based on a configurable slope 336 (e.g., a linear slope). The slope line of slope 336 can indicate that the increase in utilization 312 of queue 146 can increase probability 316 of packet 160 being marked with a level of congestion. Accordingly, MLC profile 154 can maintain a congestion point 330 for indicating the level of congestion at queue 146.

When utilization 312 remains between the starting point of slope 338 and congestion point 330, profile manager 122 can mark packet 160 with a low-level congestion indicator based on slope 338. When utilization 312 reaches congestion point 330, profile manager 122 can mark packet 160 with a high-level congestion indicator based on slope 338. The region above the slope line can be referred to as no congestion region 332, indicating that packet 160 may remain unmarked. On the other hand, the region below the slope line between the starting point of slope 338 and congestion point 330 can be referred to as a low level of congestion experienced (LLCE) region 334. Furthermore, the region below the slope line beyond congestion point 330 can be referred to as a high level of congestion experienced (HLCE) region 336. Regions 334 and 336 can indicate that packet 160 would be marked with a low-level or a high-level congestion indicator, respectively.

Overlaying drop profile 152 and MLC profile 154 as two independent traffic profiles can lead to an overlaid profile 350. The slope of overlaid profile 350 can correspond to slope 338 of MLC profile 154, and drop point 320 can be imposed from drop profile 152. Similarly, congestion point 330 can be imposed from MLC profile 154. The corresponding slope line can indicate that the increase in utilization 312 of queue 146 can increase probability 318 of packet 160 being marked with a corresponding level of congestion. However, if queue 146 becomes congested where utilization 312 reaches drop point 320, all packets can be discarded due to the impact of drop profile 152. The value of utilization 312 at and beyond drop point 320 can provide a drop region 344 wherein the packets are discarded. These discards may hinder the host's ability to get notified regarding the congestion.

If the value of utilization 312 does not reach drop point 320, the region above the slope line can be referred to as acceptance region 342, indicating that packet 160 may be accepted. On the other hand, the region below the slope line between the starting point of the slope and congestion point 330 can be referred to as LLCE region 346. Furthermore, the region below the slope line between congestion point 330 and drop point 320 can be referred to as HLCE region 348. Regions 346 and 348 can indicate that packet 160 would be marked with a low-level or a high-level congestion indicator, respectively. To avoid the discards at drop region 344 and facilitate a gradual transition to discarding all packets, drop profile 152 and MLC profile 154 can be combined into enhanced profile 150. In other words, instead of independently overlaying profiles 152 and 154 to obtain overlaid profile 350, profiles 152 and 154 can be combined to generate enhanced profile 150.

Since both drop profile 152 and MLC profile 154 can have a starting point and a slope that can determine when to mark or drop packets, system 120 can determine a combined slope 356 for enhanced profile 150. Furthermore, congestion point 330 can be imposed from MLC profile 154. Similarly, enhanced profile 150 can also maintain drop point 320 of drop profile 152 that can indicate when to assert drop for packets (e.g., based on the assertion mechanism). However, instead of dropping the packets with such an assertion, enhanced profile 150 allows profile manager 122 to accept a subset of the packets based on slope 356 and mark the subset of packets as high-level of congestion experienced.

Hence, enhanced profile 152 can include a region beyond drop point 320 that can allow acceptance for some packets with the high-level congestion indicator. As a result, unlike overlaid profile 350 that can have four regions of operations, enhanced profile 150 can provide five regions of operations. If the value of utilization 312 does not reach drop point 320, the region above the slope line of slope 356 can be referred to as acceptance region 342, indicating that packet 160 may be accepted into queue 146. On the other hand, the region below the slope line between the starting point of slope 346 and congestion point 330 can be referred to as LLCE region 346. Furthermore, the region below the slope line between congestion point 330 and drop point 320 can be referred to as HLCE region 348. In this way, enhanced profile 150 may retain acceptance region 342, LLCE region 346, and HLCE region 348 of overlaid profile 350.

However, if queue 146 becomes congested where utilization 312 reaches drop point 320, instead of discarding all packets, profile manager 122 can assert drop profile 152 on the packets based on slope 356. Profile manager 122 can accept the subset of the packets for which the drop is not asserted (i.e., the packets that pass the assertion). The subset of packets can be represented by the region above the slope line of slope 356 and beyond drop point 320. This region can be referred to as HLCE 352. The region below the slope line of slope 356 and beyond drop point 320 can be referred to as drop region 354, which is similar to drop region 344 of overlaid profile 350. In this way, region 352 of enhanced profile 150 can facilitate a gradual transition to drop region 354 for discarding packets. By allowing the subset of packets represented by region 352 to be communicated to the end host, enhanced profile 150 allows the end host to appropriately react and throttle transmission to reduce congestion.

Figure 4A:
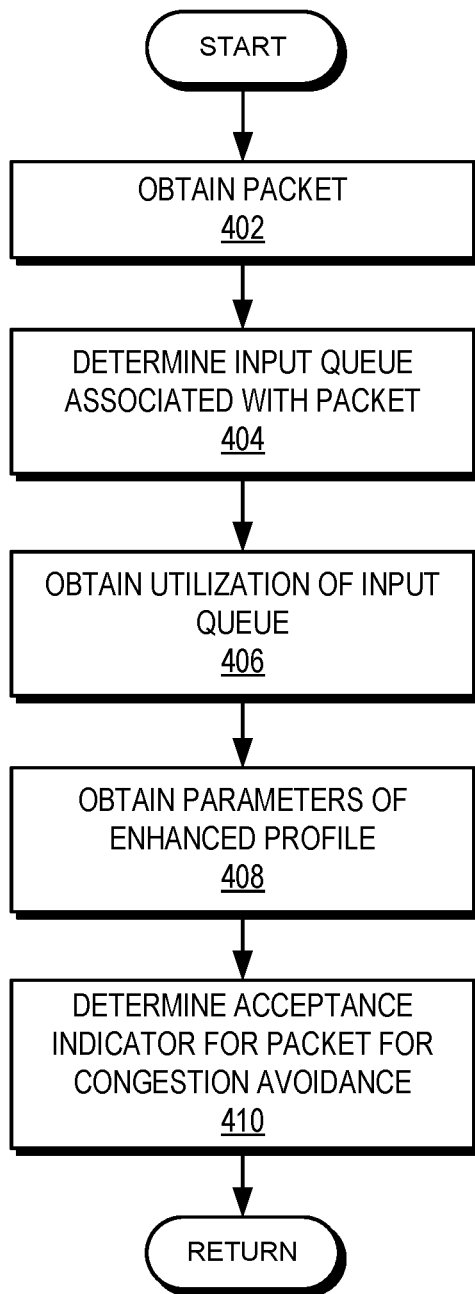
FIG. 4A presents a flowchart illustrating the process of a profile manager determining packet acceptance for congestion avoidance, in accordance with an aspect of the present application.

FIG. 4A presents a flowchart illustrating the process of a profile manager determining packet acceptance for congestion avoidance, in accordance with an aspect of the present application. During operation, the profile manager can obtain a packet (e.g., from an ingress port or a packet buffer) (operation 402) and determine an input queue associated with the packet (operation 404). The input queue can be associated with an egress port and a class of service of the packet. The profile manager can then obtain the utilization of the input queue (operation 406) and the parameters of the enhanced profile (operation 408). The profile manager can then determine an acceptance indicator for the packet for congestion avoidance (operation 410). The acceptance indicator can correspond to one of the regions of the enhanced profile.

Figure 4B:
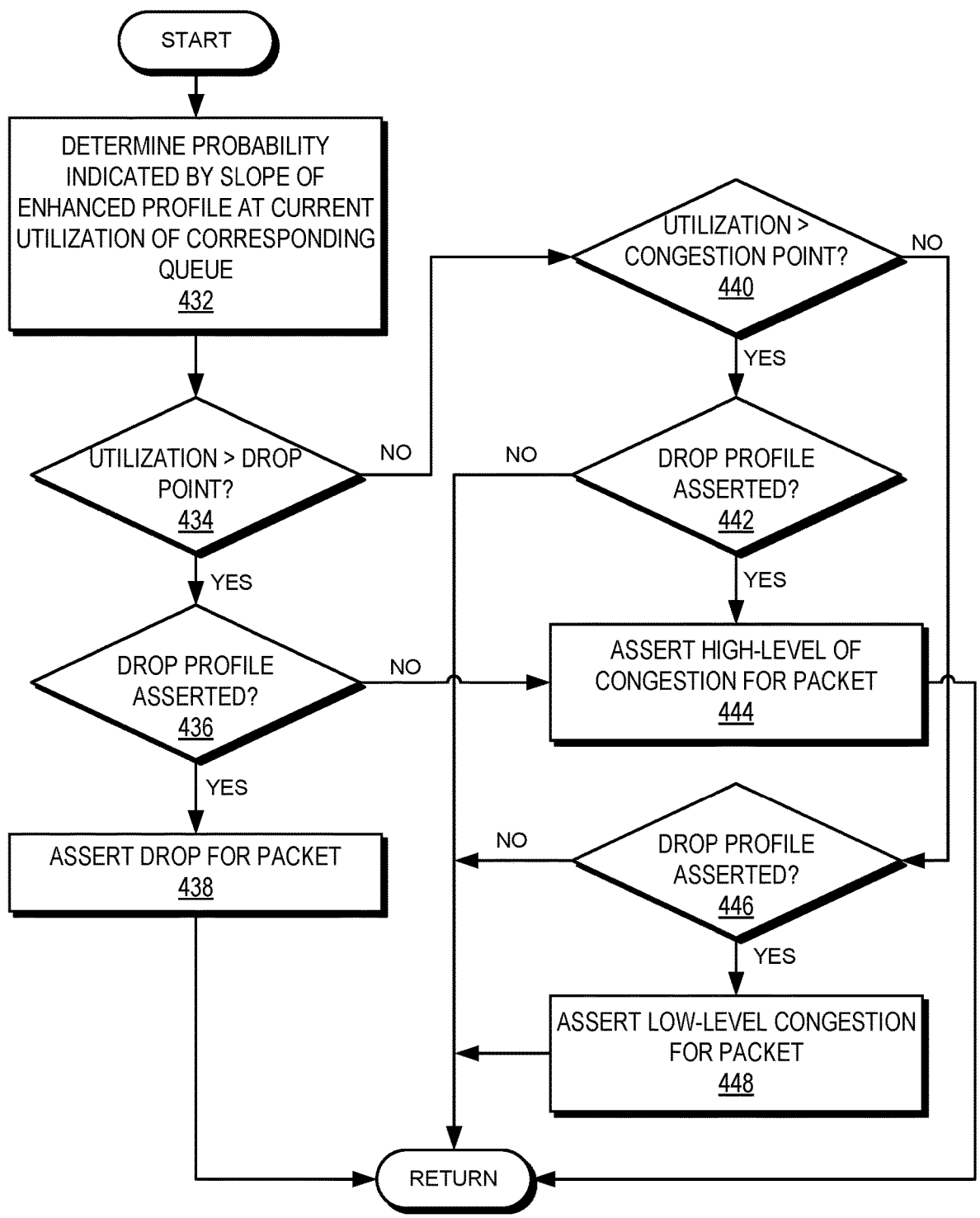
FIG. 4B presents a flowchart illustrating the process of a profile manager asserting drop or congestion on a packet for congestion avoidance, in accordance with an aspect of the present application.

FIG. 4B presents a flowchart illustrating the process of a profile manager asserting drop or congestion on a packet for congestion avoidance, in accordance with an aspect of the present application. During operation, the profile manager can determine the probability indicated by the slope of the enhanced profile at the current utilization of the corresponding queue (operation 432). The profile manager can then determine whether the utilization of the queue is greater than the drop point (operation 434). If the utilization is greater than the drop point, the profile manager can also determine whether the drop profile is asserted for the packet (operation 436). The drop profile is asserted if a probability associated with the packet is below the probability indicated by the slope at the utilization level of the queue. Such an assertion can be considered as a "fail" for the assertion test. If the drop profile is asserted for the packet (operation 436), the profile manager can assert a drop for the packet (operation 438).

If the utilization is not greater than the drop point, the profile manager can determine whether the utilization of the queue is greater than the congestion point (operation 440). If the utilization is greater than the congestion point, the profile manager can also determine whether the drop profile is asserted for the packet (operation 442). If the drop profile is not asserted for the packet when the utilization is greater than the drop point (operation 436) or the drop profile is asserted for the packet when the utilization is greater than the congestion point (operation 442), the profile manager can assert a high-level of congestion for the packet (operation 444). On the other hand, if the utilization is not greater than the congestion point, the profile manager can also determine whether the drop profile is asserted for the packet (operation 446). If the drop profile is asserted for the packet when the utilization is not greater than the congestion point (operation 446), the profile manager can assert a low level of congestion for the packet (operation 448).

Figure 4C:
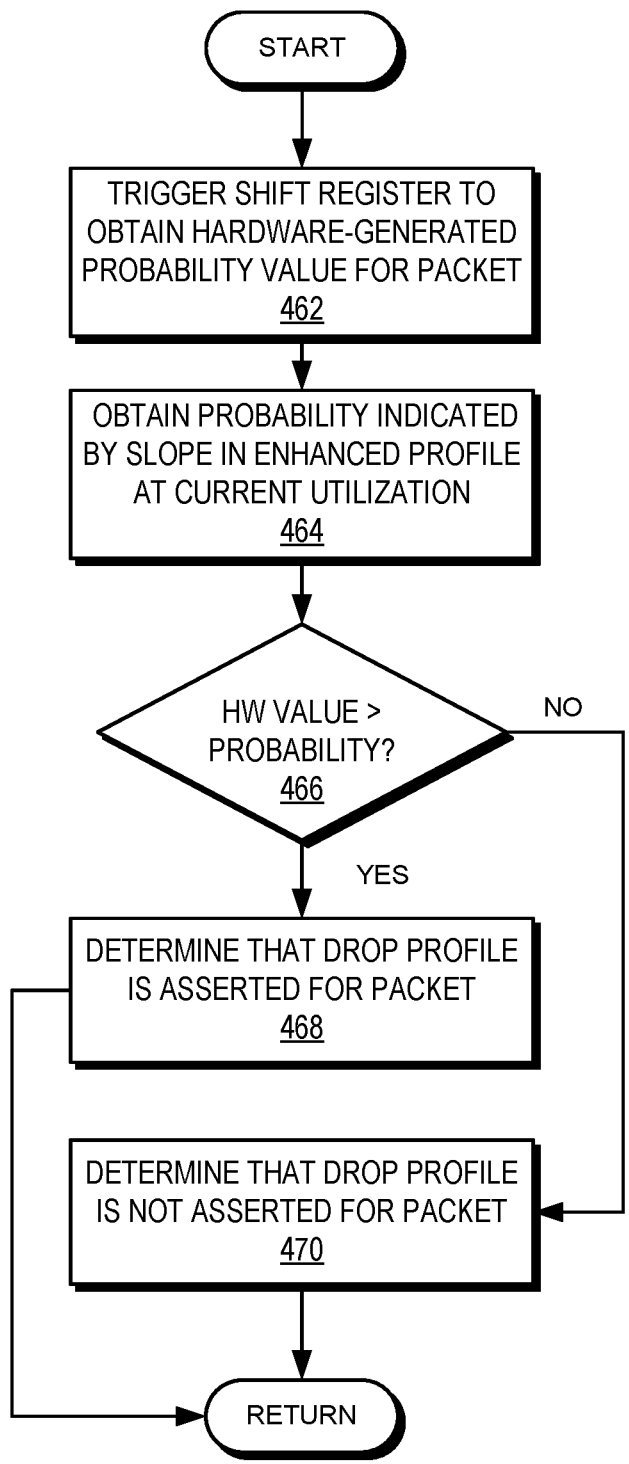
FIG. 4C presents a flowchart illustrating the process of a profile manager asserting a drop profile on a packet, in accordance with an aspect of the present application.

FIG. 4C presents a flowchart illustrating the process of a profile manager asserting a drop profile on a packet, in accordance with an aspect of the present application. During operation, the profile manager can trigger a shift register of a computing system (e.g., an end host or a switch) to obtain a hardware-generated probability value for the packet (operation 462). The profile manager can also obtain the probability indicated by the slope in the enhanced profile at the current utilization of the queue (operation 464). The profile manager can then determine whether the hardware-generated value is greater than the probability obtained from the profile (operation 466). If the hardware-generated value is greater than the probability, the profile manager can determine that the profile is asserted for the packet (operation 468). On the other hand, if the hardware-generated value is not greater than the probability, the profile manager can determine that the profile is not asserted for the packet (operation 470).

Figure 5A:
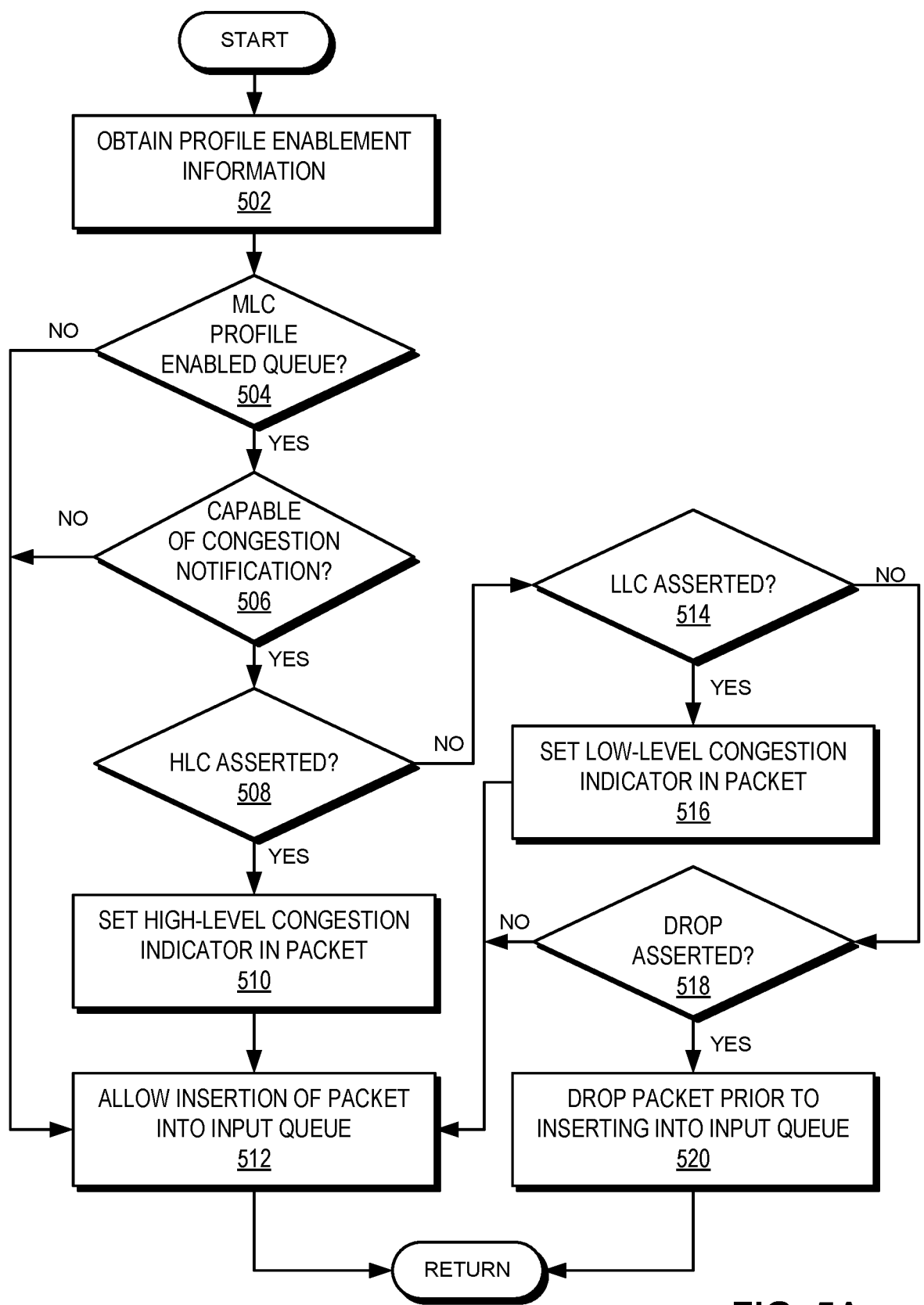
FIG. 5A presents a flowchart illustrating the process of a profile manager remarking a packet for congestion avoidance, in accordance with an aspect of the present application.

FIG. 5A presents a flowchart illustrating the process of a profile manager remarking a packet for congestion avoidance, in accordance with an aspect of the present application. During operation, the profile manager can obtain profile enablement operation of the relevant systems (operation 502). Based on the information, the profile manager can determine whether an MLC profile is enabled (e.g., MECN enabled) for the queue (operation 504). If the MLC profile is enabled, the profile manager can also determine whether the local system (e.g., the software and/or hardware of the local computing system) is capable of congestion notification (e.g., MECN capable) (operation 506).

If the local system is capable of congestion notification, the profile manager can determine whether a high level of congestion is asserted for the packet (operation 508). If the high level of congestion is asserted, the profile manager can set a high-level congestion indicator in the packet (operation 510). The congestion indicator can be one or more fields of the header of the packet that can be used for the ECN (e.g., two bits of the DSCP field in the IP header of the packet). If the high level of congestion is not asserted, the profile manager can determine whether a low level of congestion is asserted for the packet (operation 514). If the low level of congestion is asserted, the profile manager can set a low-level congestion indicator in the packet (operation 516). If the low level of congestion is not asserted, the profile manager can determine whether a drop is asserted for the packet (operation 518).

If a drop is asserted, the profile manager can drop the packet prior to inserting it into an input queue (operation 520). If the MLC profile is not enabled (operation 504) or the local system is not capable of congestion notification (operation 506), the application of the enhanced profile manager becomes moot. Consequently, the profile manager can then allow the insertion of the packet into the input queue (operation 512). On the other hand, upon setting the high-level or low-level congestion indicator in the packet (operation 510 or 516, respectively), or if a drop is not asserted for the packet (operation 518), the profile manager can also allow the insertion of the packet into the input queue (operation 512). In this way, the profile manager can use the enhanced profile to assert both congestion and drop in a converged way.

Figure 5B:
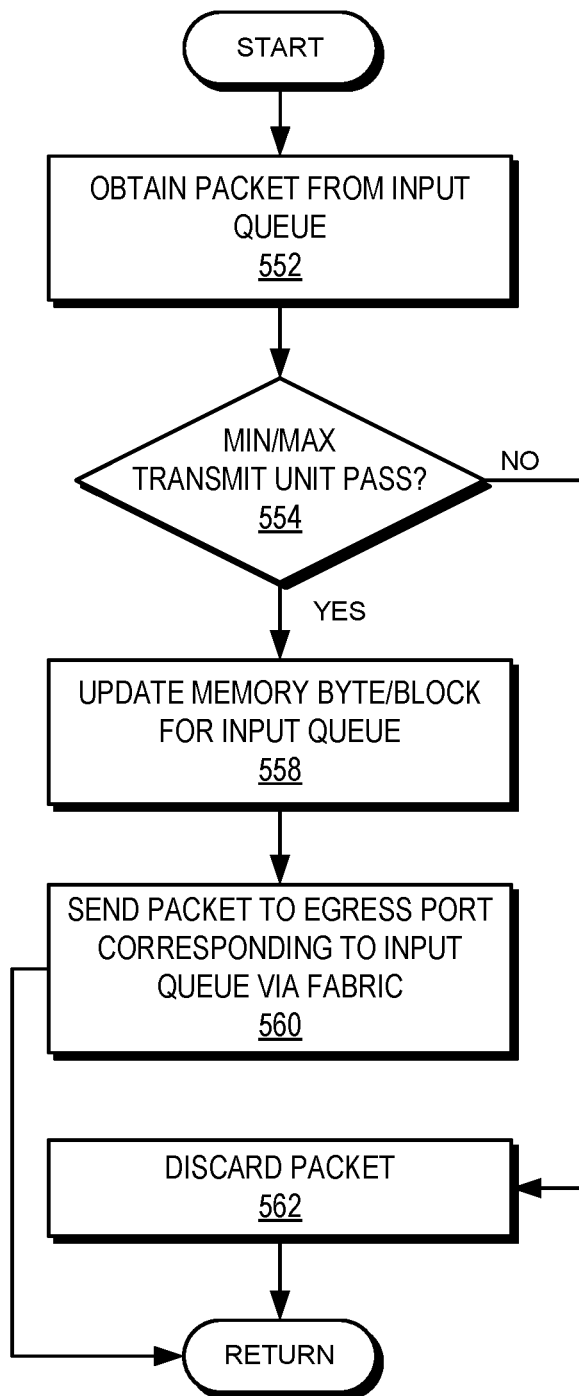
FIG. 5B presents a flowchart illustrating the process of a packet processor facilitating forwarding of a marked packet, in accordance with an aspect of the present application.

FIG. 5B presents a flowchart illustrating the process of a packet processor facilitating forwarding of a marked packet, in accordance with an aspect of the present application. During operation, the packet processor can obtain a packet from an input queue (operation 552) and determine whether the packet passes the minimum and maximum transmission unit test (operation 554). This test can indicate whether the packet's data units are within the minimum and maximum transmission units. If the packet passes, the packet processor can update the memory byte/block of the input queue (i.e., to reflect the removal of the packet) (operation 558). Subsequently, the packet processor can send the packet to the egress port corresponding to the input queue via the fabric (operation 560). If the packet does not pass, the packet processor can discard the packet (operation 562).

Figure 6:
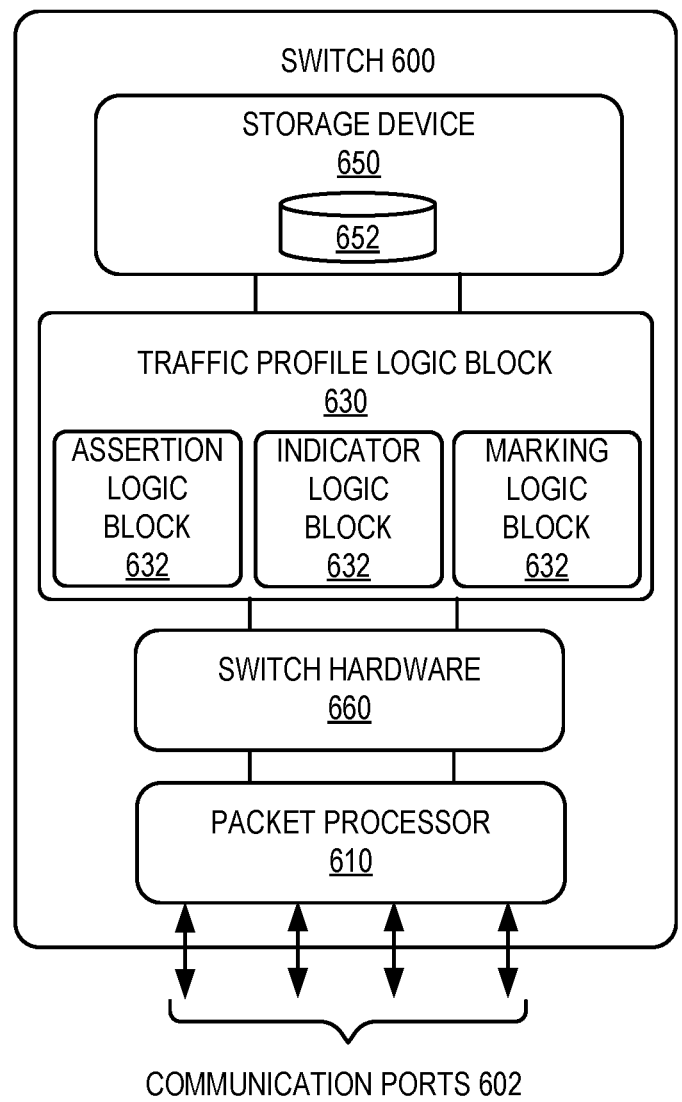
FIG. 6 illustrates an example of a switch supporting an integrated traffic profile for indicating multi-level congestion and packet drop, in accordance with an aspect of the present application.

FIG. 6 illustrates an example of a switch supporting an integrated traffic profile for determining congestion indicator and packet drop, in accordance with an aspect of the present application. In this example, a switch 600 includes a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a media access control (MAC) address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can include a traffic profile logic block 630, which can generate an enhanced traffic profile based on the drop and MLC traffic profiles. Traffic profile logic block 630 can also accept the user configuration related to the enhanced traffic profile. Traffic profile logic block 630 can include an assertion logic block 632, an indicator logic block 634, and a marking logic block 636. Assertion logic block 632 can assert the enhanced profile on a respective packet. Indicator logic block 634 can indicate whether to accept, accept with a high-level congestion indicator, accept with a low-level congestion indicator, or drop a packet. Marking logic block 636 can mark a packet based on the indication from indicator logic block 634.

Switch 600 can maintain a database 652 (e.g., in storage device 650). Database 652 can be a relational database and may run on one or more DBMS instances. Database 652 can store information associated with a respective traffic profile for switch 600 (e.g., a drop profile, an MLC profile, and an enhanced profile).

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   determining, by a switch, a first traffic profile indicating whether to drop a packet based on utilization of a queue, wherein packets from the queue are forwarded via an egress port reachable via a fabric of interconnections;
   determining, by the switch, a second traffic profile indicating whether to indicate a level of congestion in the packet based on the utilization of the queue;
   determining a third traffic profile by combining the first and second traffic profiles, wherein the third traffic profile indicates acceptance at the queue for a subset of packets being selected for dropping prior to being inserted into the queue based on the utilization of the queue; and
   in response to the packet being selected for dropping, determining whether to accept the packet into the queue with a high-level congestion indicator based on the third traffic profile; and
   in response to the utilization of the queue being less than a congestion threshold, accepting the packet into the queue with a low-level congestion indicator in the packet based on the third traffic profile.

2. The method of claim 1, further comprising whether the switch is capable of indicating a level of congestion in the packet.

3. The method of claim 1, further comprising:
   obtaining a first probability value generated by a piece of hardware of the switch; and
   comparing the first probability value with a second probability value that is indicated in the third profile and corresponds to the utilization of the queue.

4. The method of claim 3, wherein the second probability value is defined as a linear slope between a probability of indicating the level of congestion in the packet and the utilization of the queue.

5. The method of claim 3, wherein determining whether to accept the packet at the queue further comprises:
   determining whether the utilization of the queue is greater a drop threshold indicated in the third profile; and
   determining whether the first probability value is greater than the second probability value.

6. The method of claim 5, further comprising, in response to the first probability value being less than the second probability value and the utilization of the queue being greater than the drop threshold, dropping the packet.

7. The method of claim 3, wherein, in response to the packet not being selected for dropping, the method comprises:
   in response to the utilization of the queue being greater than the congestion threshold and the first probability value being greater than the second probability value, accepting the packet into the queue with a high-level congestion indicator in the packet.

8. The method of claim 3, wherein accepting the packet into the queue with the low-level congestion indicator further comprises, determining whether the utilization of the queue is less than the congestion threshold and whether the first probability value is greater than the second probability value.

9. The method of claim 1, wherein the first profile is a profile of random early detection (RED) or a variation thereof; and wherein the second profile is a profile of Multi-level Explicit Congestion Notification (MECN) or a variation thereof.

10. A computer system, comprising:
    processing circuitry;
    a traffic profile logic block to:
      determine a first traffic profile indicating whether to drop a packet based on utilization of a queue, wherein packets from the queue are forwarded via an egress port reachable via a fabric of interconnections;
      determine a second traffic profile indicating whether to indicate a level of congestion in the packet based on the utilization of the queue; and
      determine a third traffic profile by combining the first and second traffic profiles, wherein the third traffic profile indicates acceptance at the queue for a subset of packets being selected for dropping prior to being inserted into the queue based on the utilization of the queue;
    an assertion logic block to, in response to the packet being selected for dropping, determine whether to accept the packet into the queue with a high-level congestion indicator based on the third traffic profile; and
    a marking logic block to in response to the utilization of the queue being less than a congestion threshold, accept the packet into the queue with a low-level congestion indicator in the packet based on the third traffic profile.

11. The computer system of claim 10, further comprising an indicator logic block to determine whether the computer system is capable of indicating congestion in the packet.

12. The computer system of claim 10, wherein the assertion logic block is further to:
    obtain a first probability value generated by a piece of hardware of the computer system; and
    compare the first probability value with a second probability value that is indicated in the third profile and corresponds to the utilization of the queue.

13. The computer system of claim 12, wherein the second probability value is defined as a linear slope between a probability of indicating the level of congestion in the packet and the utilization of the queue.

14. The computer system of claim 12, wherein the assertion logic block determines whether to accept the packet at the queue by:
    determining whether the utilization of the queue is greater a drop threshold indicated in the third profile; and
    determining whether the first probability value is greater than the second probability value.

15. The computer system of claim 14, wherein the assertion logic block is further to, in response to the first probability value being less than the second probability value and the utilization of the queue being greater than the drop threshold, drop the packet.

16. The computer system of claim 12, wherein the marking logic block is further to, in response to the packet not being selected for dropping, the utilization of the queue being greater than the congestion threshold, and the first probability value being greater than the second probability value, accept the packet into the queue with a high-level congestion indicator in the packet.

17. The computer system of claim 12, wherein the marking logic block is to accept the packet into the queue with the low-level congestion indicator by determining whether the utilization of the queue is less than the congestion threshold and whether the first probability value is greater than the second probability value.

18. The computer system of claim 10, wherein the first profile is a profile of random early detection (RED) or a variation thereof; and wherein the second profile is a profile of Multi-level Explicit Congestion Notification (MECN) or a variation thereof.

19. A non-transitory computer-readable storage medium storing instructions that when executed by a computer cause the computer to perform a method, the method comprising:
 determining, by the computer, a first traffic profile indicating whether to drop a packet based on utilization of a queue, wherein packets from the queue are forwarded via an egress port reachable via a fabric of interconnections;
 determining, by the computer, a second traffic profile indicating whether to indicate a level of congestion in the packet based on the utilization of the queue;
 determining a third traffic profile by combining the first and second traffic profiles, wherein the third traffic profile indicates acceptance at the queue for a subset of packets being selected for dropping prior to being inserted into the queue based on the utilization of the queue; and
 in response to the packet being selected for dropping, determining whether to accept the packet into the queue with a high-level congestion indicator based on the third traffic profile; and
 in response to the utilization of the queue being less than a congestion threshold, accepting the packet into the queue with a low-level congestion indicator in the packet based on the third traffic profile.

20. The non-transitory computer-readable storage medium of claim 19, wherein the method further comprises:
 determining whether the utilization of the queue is within a threshold indicated in the third profile; and
 determining whether a first probability value is greater than the second probability value, wherein the first probability value is generated by a piece of hardware of the computer, and wherein the second probability value is indicated in the third profile and corresponds to the utilization of the queue.

* * * * *